July 31, 1945.　　　T. J. TUREK　　　2,380,558
FLUID PRESSURE CONTROL MECHANISM
Filed May 3, 1943
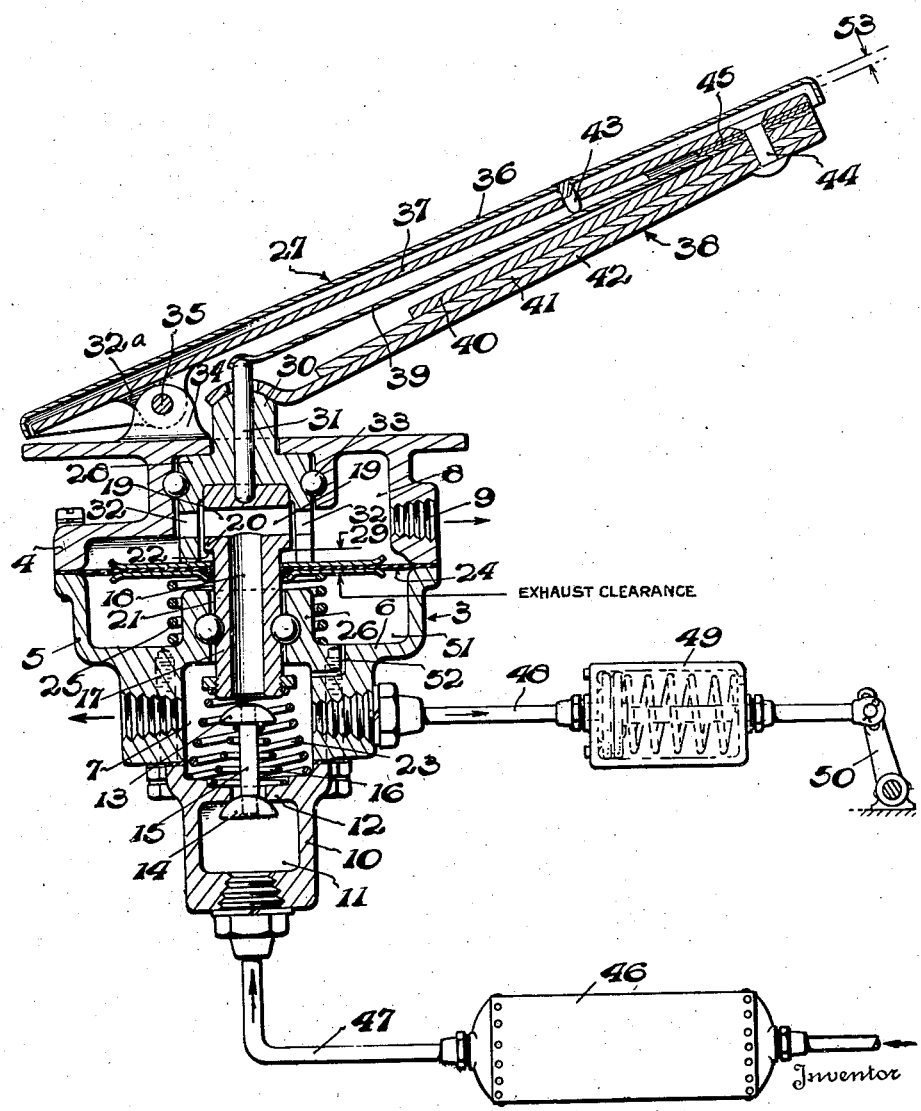
Inventor
Thomas J. Turek.
By N. D. Parker Jr.
Attorney Patented July 31, 1945

2,380,558

UNITED STATES PATENT OFFICE 2,380,558

FLUID PRESSURE CONTROL MECHANISM

Thomas J. Turek, Elyria, Ohio, assignor to Bendix-Westinghouse Automatic Air Brake Company, Elyria, Ohio, a corporation of Delaware Application May 3, 1943, Serial No. 485,499

19 Claims. (Cl. 303—54)

This invention relates to fluid pressure control mechanism and more particularly to a valve device together with novel control mechanism for controlling fluid pressure systems.

One of the objects of the present invention is to provide a novel control valve mechanism of the self-lapping type wherein an improved control of the valve mechanism is achieved by novel coordination of the valve mechanism and the manual control means therefor.

Another object is to provide, in a device of the above character, a novel two-piece control member cooperable with the valvular mechanism whereby the outlet valve of said mechanism will be maintained in a closed position whenever one portion of the control mechanism is depressed and prior to depression of the other portion of said control mechanism.

A further object is to provide, in a self-lapping valvular mechanism of the foregoing type, a novel two-piece pedal member cooperable with the valvular mechanism wherein the outlet valve of the valvular mechanism will be maintained in a closed position upon depression of one portion of said pedal member and wherein the inlet valve will be maintained in open position upon depression of the second portion of said pedal member.

A still further object is to provide, in a device of the foregoing type, a novel combination of pedal and valve mechanism wherein a pair of valve graduating springs are mounted on and carried by the pedal member in such manner as to insure a novel and rapid actuation of the valve mechanism upon movement of the pedal.

An additional object is to provide, in a fluid presure control mechanism, a novel combination of valve mechanism and control therefor whereby flow of fluid pressure may be attained rapidly and smoothly upon actuation of the control member.

Other objects and novel features of the invention will appear more fully hereinafter from the following detailed description when taken in connection with the accompanying drawing illustrative of one form of the invention. It is to be expressly understood, however, that the drawing is utilized for the purpose of illustration only and is not designed as a definition of the limits of the invention, reference being had for this purpose to the appended claims.

The drawing illustrates an axial sectional view of a combined valvular mechanism and control therefor constructed in accordance with the principles of this invention.

Referring to the drawing, the invention is disclosed therein as embodying a self-lapping valvular mechanism including a casing 3 formed of upper and lower sections 4 and 5, respectively. The casing may be secured to a support such as the floorboards of the vehicle in any suitable manner so as to be readily accessible to the vehicle operator. As shown, the casing is divided into a plurality of chambers, a partition 6 being provided and forming in said casing an outlet chamber 7 and exhaust chamber 8, the latter being vented to atmosphere through an opening 9. Lower casing section 5 is so formed as to receive an inlet housing member 10 including an intake chamber 11 and an intake valve seat member 12.

Valve means are provided for controlling the flow of fluid pressure from intake chamber 11 to outlet chamber 7 and from the latter to exhaust chamber 8. As shown, such means are constituted by exhaust and intake valves 13 and 14 interconnected by a rod 15. A spring 16 seated upon the intake valve seat member 12 and located in chamber 7 supports valves 13 and 14 and, as shown, normally urges the valves upwardly in order to effect a closure of the intake valve 14.

In order to actuate valves 13 and 14 for purposes of controlling flow of fluid to the outlet chamber and also to control communication between the outlet and exhaust chambers, a valve actuating plunger 17 is employed, having an axial bore 18 and transverse passages 19 forming passages for flow of exhaust fluid. Plunger 17 is further characterized by including an enlarged portion 20, a reduced portion 21, a shoulder 22 between said enlarged and reduced portions, and threads located on the lower end of the reduced portion. A spring 23 seated upon the surface of the intake valve seat member 12 and located in chamber 7 cooperates with an adjustable nut mounted on the threaded portion of plunger 17 to normally urge the plunger into its extreme upward position and out of contact with exhaust valve 13.

In order to provide a self-lapping valve structure, a pressure-responsive element constituted by a diaphragm 24 clamped between casing sections 4 and 5 and separating exhaust chamber 8 from partition 6 is provided. Diaphragm 24 is maintained in a close slidable relationship with plunger 17, which passes through a bore in the diaphragm, as by means of a resilient sealing ring, preferably of rubber, mounted between a pair of plates bonded to the diaphragm, said sealing ring contacting the plunger, as shown. A spring 25 seated upon partition 6 and surrounding an upwardly extending flange 26 on said partition cooperates with the diaphragm 24 to normally maintain the diaphragm in contact with the lower end of a piston member hereinafter to be described. Means cooperable with plunger 17 and diaphragm 24 to complete the self-lapping valve mechanism consists of a piston member 28 located in exhaust chamber 8, said piston member being mounted in such manner as to surround the upper portion of plunger 17 and being mounted in slidable relationship with respect to plunger 17. Piston 28 is of such construction as to normally extend downwardly beyond the shoulder 22 of plunger 17 to contact diaphragm 24, thereby limiting upward movement of the diaphragm to normally provide a clearance 29, herein termed an exhaust clearance, between the shoulder 22 of plunger 17 and diaphragm 24, which clearance is equal to the clearance provided between the lower end of plunger 17 and exhaust valve 13 whenever plunger 17 is out of contact with said exhaust valve. Piston 28 is further characterized by including a stem portion 30 extending through the upper casing section 4 and cooperating with a control mechanism hereinafter to be described. Ports 32 are provided in piston 28 to form openings for passage of exhaust fluid from the ports of plunger 17 to exhaust chamber 8. A sealing ring 33 is provided between piston 28 and a downwardly extending flange on casing section 4 in order to prevent leakage of exhaust fluid and to prevent entrance of dirt and dust into the valve mechanism.

Novel means as contemplated by this invention for actuating plunger 17 together with piston 28 are provided, and, as shown, include a manually-operable pedal control member 27 together with a novel spring assembly 38 positioned exteriorly of the casing 3, such spring assembly being operatively associated with both the pedal control member 27 and with piston 28 and plunger 17. More particularly, pedal control member 27 includes a pedal 37 pivotally mounted upon the upper casing section 4, as by means of a pair of ears 32a, one of which is illustrated, depending from the rear portion of the pedal. Ears 32a carried by pedal 37 cooperate with a set of ears 34 formed on or secured to casing section 4, a rod or pin 35 serving to interconnect the cooperating ears to provide a pivotal mounting for the pedal. Pedal control means 27 also include novel means for operating plunger 17 independently of movement of pedal 37 in cooperation with a novel spring assembly 38 hereinafter to be described. More particularly, such means include a plate member 36 mounted over pedal 37 in such manner as to cover the upper surface of the pedal and as to be relatively movable with respect to the pedal, said plate being pivotally mounted upon casing section 4 as by means of ears, not shown, cooperable with ears 34 on said casing section and rod 35 to pivot about the rod in a manner similar to pedal 37. A downwardly extending bar 43 attached to the plate member 36 projects through a transverse groove in pedal 37, near the forward end thereof, to cooperate with spring assembly 38 to actuate plunger 17 upon depression of the plate.

Novel means, as contemplated by this invention, for operatively connecting plate 36 and pedal 37 to plunger 17 and piston 28, respectively, in order to actuate the valve mechanism, consists of a spring assembly 38, which is preferably formed of leaf springs 39, 40, 41 and 42. One end of said leaves is rigidly secured to the forward portion of pedal 37, as by means of a rivet 44, a pair of shims 45 being placed between leaf spring 39 and pedal member 37 to separate said springs from said pedal member. The inner end of spring 39 cooperates with pin 31 slidably mounted in a bore in stem 30 of piston 28, while the corresponding end of spring 42 is cooperable with stem 30 of piston 28, in order to secure actuation of the valve assembly upon depression of plate 36 together with pedal 37. In the commercial embodiment of the invention, it has been found preferable that the tension of the spring 39 be graduated to increase at a rate faster than that of spring 42 upon depression of the plate and pedal. However, if it be found desirable, this tensioning of the springs may be varied without exceeding the scope of the invention. It will be understood that leaf spring 39, through the action of spring 23, the force of which is transferred to spring 39 through plunger 17 and pin 31, will normally react on bar 43 fastened to plate 36 to force the plate out of contact with pedal 37 to provide a clearance 53 between the pedal and plate, and that depression of the plate will result in sliding plunger 17 downwardly to an extent sufficient to close the opening normally maintained between the plunger and exhaust valve 13 and at the same time take up the exhaust clearance 29 provided between the shoulder 22 of plunger 17 and diaphragm 24. In this manner, a quick lapping of the exhaust valve is attained prior to any movement of the pedal member. In order to maintain the parts in the normal position illustrated in the drawing with pin 31 in contact with leaf spring 39, and stem 30 of piston 28 in contact with leaf spring 42, coil springs 23 and 25 heretofore described are provided.

In utilizing the valve structure heretofore described, the intake chamber 11 is connected with the fluid pressure reservoir 46 as by conduit 47, while the outlet chamber is connected with a fluid pressure actuator 49, as by means of conduit 48, said actuator being connected to any suitable device 50 to be actuated.

In operation, and considering the parts are so adjusted that intake valve 14 is closed and plunger 17 is spaced above exhaust valve 13 as illustrated in the drawing, depression of plate 36 will move the plunger downwardly to close the exhaust valve. Further depression of the plate, together with pedal 37, will result in downward movement of piston 28 together with diaphragm 24, as well as further movement of the plunger 17. It is particularly to be noted that the action is such that the exhaust valve is closed prior to any depression of the pedal member for it is in this manner that the quick lapping of the exhaust valve is attained, with the result that slight depression of the pedal results in immediate opening of the intake valve. As stated, movement of the pedal will effect an opening of the intake valve 14, whereupon fluid pressure from reservoir 46 will be conducted directly to the outlet chamber 7 by way of conduit 47, intake chamber 11 and open intake valve 14. In order to delay the application of fluid pressure from outlet chamber 7 to chamber 51 immediately below diaphragm 24, a choke 52 is interposed in partition 6. With such an arrangement, the rate of pressure build-up within the actuator 49 supplied from chamber 7 will be materially greater than the rate of pressure increase within chamber 51 beneath diaphragm 24, and the actuator will be promptly actuated notwithstanding the fact that it is positioned remotely as regards the control valve mechanism. It will also be noted that this action will be reversed when the valves are moved to exhaust position, and hence the exhausting phase of the actuator will likewise take place in a rapid manner.

It will be understood that, after the first initial movement of pedal 37, assuming that the same remains in a given position, sufficient pressure must be built up beneath the element 24 to overcome the force existing in springs 39 and 42, before the diaphragm 24 can effect upward movement of plunger 17 in order to permit closing of intake valve 14 and exhaust of excess pressure over that to be provided by the given setting. Thus, with a slight initial pressure on pedal 37, a substantial pressure may be promptly created within the actuator 49 before the valve mechanism laps. Preferably, the initial increment of pressure supplied by the valvular mechanism is such as to overcome starting friction together with any biasing forces residing in the actuator 49 and vehicle control elements connected thereto. In order to maintain shoulder 22 of plunger 17 in contact with diaphragm 24 upon depression of pedal 37 with consequent admission of fluid pressure to outlet chamber 7, the tension of leaf spring 39 is graduated to increase at a rate faster than that of leaf spring 42, as heretofore described. Thus, upon reaching a condition of balanced pressure in outlet chamber 7, any leak which might occur in outlet conduit 48 would relieve pressure both upon the plunger and diaphragm with the result that both leaf springs act to open intake valve 14, leaf spring 42 acting, not to directly actuate plunger 17 but, rather, to counteract the upward force therein due to fluid pressure acting on diaphragm 24 for the purpose of permitting leaf spring 39 to actually open the intake valve. On the other hand, any tendency for the open intake valve to permit a build-up of excessive pressure in outlet chamber 7 will be compensated for by action of this pressure not only on diaphragm 24 but also on the area of shoulder 22 of valve plunger 17.

It will readily be understood from the foregoing description that successive movements of pedal 37 in a downward direction will result in an increased pressure being supplied to the actuator 49. Should it be desired to apply full reservoir pressure to the actuator, it is only necessary to depress pedal 37 to such position that the end of leaf spring 39 adjacent the inner end of pedal 37 engages the lower surface of the pedal. Such action will maintain intake valve 14 in open position, irrespective of any tendency of element 24 to lap the valves, and is never resorted to under normal conditions of operation.

There is thus provided by this invention a novel and improved combination of valve mechanism and control therefor for controlling fluid pressure whereby a more rapid and smooth control of fluid pressure flow may be attained than was heretofore possible by other devices known to those skilled in the art. The use of two leaf-type graduating springs in combination with a two-piece pedal control member provides novel means for closing the exhaust valve prior to depression of the pedal member, whereby this improved control is attained. The use of graduating springs of the leaf type, by reason of the friction between the leaves, avoids any tendency that the valve parts might have to vibrate or chatter.

While one embodiment of the invention has been disclosed and herein described with considerable particularity, it is to be expressly understood that the invention is not limited to the form shown but is capable of a variety of mechanical expressions. It will be further understood that various rearrangements of the parts may be resorted to and certain elements used without others without departing from the spirit of the invention, as will be well understood by those skilled in the art. Reference will be had, therefore, to the appended claims for a definition of the invention.

What is claimed is:

1. In combination with a self-lapping valvular mechanism having a casing, inlet and outlet valves in said casing, an assembly for actuating said valves including a pair of relatively movable members, control means for actuating said assembly comprising a pedal pivotally mounted on said casing, a plate pivotally mounted on said casing, and means for operatively connecting said control means with said assembly to cause actuation of said valves upon movement of said control means.

2. In combination with a self-lapping valvular mechanism having a casing, inlet and outlet valves in said casing, an assembly for actuating said valves including a pair of relatively movable members, control means for actuating said assembly comprising a pedal pivotally mounted on said casing, a plate movable relative to said pedal pivotally mounted on said casing, and means operatively connecting said control means with said assembly to cause actuation of said valves upon movement of said control means.

3. In combination with a self-lapping valvular mechanism having a casing, inlet and outlet valves in said casing, an assembly for actuating said valves including a pair of relatively movable members, control means for actuating said assembly comprising a pedal pivotally mounted on said casing, a plate movable relative to said pedal pivotally mounted on said casing, and resilient means operatively connecting said control means with said assembly to close said outlet valve upon movement of said plate and to open said inlet valve upon movement of said pedal.

4. In combination with a self-lapping valvular mechanism having a casing, inlet and outlet valves in said casing, an assembly for actuating said valves including a pair of relatively movable members, control means for actuating said assembly comprising a pedal pivotally mounted on said casing, a plate movable relative to said pedal pivotally mounted on said casing, and means operatively connecting said control means and said assembly to cause actuation of said valves upon movement of said control means comprising a pair of leaf springs having one end thereof rigidly attached to said pedal, and the other ends thereof operatively connected with said assembly.

5. In combination with a self-lapping valvular mechanism having a casing, inlet and outlet valves in said casing, an assembly for actuating said valves including a pair of relatively movable members, control means for actuating said assembly comprising a pedal pivotally mounted on said casing, a plate movable relative to said pedal pivotally mounted on said casing, and means for operatively connecting said control means and assembly comprising a pair of leaf springs having one end thereof rigidly attached to said pedal, one of said springs being operatively associated with said plate and assembly, the other of said springs being operatively associated with said pedal and assembly.

6. In combination with a self-lapping valvular mechanism having a casing, inlet and outlet valves in said casing, an assembly for actuating said valves including a diaphragm, a plunger slidably mounted in said diaphragm, a piston operatively associated with said plunger and diaphragm, control means for actuating said assembly comprising a pedal and a plate pivotally mounted on said casing, and means for operatively connecting said control means with said assembly to cause actuation of said valves upon movement of said control means.

7. In combination with a self-lapping valvular mechanism having a casing, inlet and outlet valves in said casing, an assembly for actuating said valves including a diaphragm, a plunger slidably mounted in said diaphragm, a piston operatively associated with said plunger and diaphragm, control means for actuating said assembly comprising a pedal and a plate pivotally mounted on said casing, and means for operatively connecting said assembly with said control means to close said outlet valve upon movement of said plate and to open said inlet valve upon movement of said pedal.

8. In combination with a self-lapping valvular mechanism having a casing, inlet and outlet valves in said casing, an assembly for actuating said valves including a diaphragm, a plunger slidably mounted in said diaphragm having a collar cooperable with said diaphragm to limit movement of said plunger relative to said diaphragm, a piston operatively associated with said plunger and diaphragm, control means for actuating said assembly comprising a pedal pivotally mounted on said casing, a plate pivotally mounted on said casing, said plate being movable relative to said pedal, and means for operatively connecting said control means with said assembly to close the outlet valve upon movement of said plate and to open said inlet valve upon movement of said pedal.

9. In combination with a self-lapping valvular mechanism having a casing, inlet and outlet valves in said casing, an assembly for actuating said valves including a diaphragm, a plunger slidably mounted in said diaphragm, a piston operatively associated with said plunger and diaphragm, control means for actuating said assembly comprising a pedal and a plate pivotally mounted on said casing, and means for operatively connecting said control means with said assembly to cause actuation of said valves upon movement of said control means comprising a pair of leaf springs having one end thereof rigidly secured to said pedal, one of said springs being operatively connected with said plate and plunger, the other of said springs being operatively connected with said pedal and piston.

10. A self-lapping control valve for fluid pressure mechanism comprising a casing having inlet and exhaust valves therein, means for operating said valves including a pivotally mounted pedal, a pivotally mounted plate, resilient means carried by the pedal having a portion thereof operatively associated with said plate, means connecting said portion with said valves to close said exhaust valve upon depression of said plate, and means associated with the remainder of said resilient means to actuate said valves upon depression of said pedal.

11. In combination with a fluid motor, means including a remotely positioned self-lapping valvular mechanism for controlling the flow of fluid to and from said motor comprising a casing having inlet and exhaust valves therein, means for operating said valves including a pivotally mounted pedal, a pivotally mounted plate, resilient means carried by said pedal having a portion thereof operatively associated with said plate, means operatively connecting said portion with said valves to close said exhaust valve upon movement of said plate, and means associated with the remainder of said resilient means for actuating said valves upon depression of said pedal.

12. A self-lapping control valve for fluid pressure mechanism comprising a casing having inlet and exhaust valves therein, means for operating said valves including a pivotally mounted pedal, a pivotally mounted plate, a pair of springs carried by said pedal, one of said springs being operatively associated with said plate, means connecting said spring with said valves to close the exhaust valve upon movement of said plate, and means connecting the other of said springs with said valves to open the inlet valve upon depression of the pedal.

13. A self-lapping control valve for fluid pressure mechanism comprising a casing having inlet and exhaust valves therein, means for operating said valves including a pivotally mounted pedal, a pivotally mounted plate movable relative to said pedal, a pair of valve-graduating leaf springs carried by said pedal, one of said springs being operatively associated with said plate, means connecting said spring with said valves to close the exhaust valve upon movement of said plate, and means associated with the other of said springs to actuate said valves upon movement of said pedal.

14. A self-lapping control valve for fluid pressure mechanism comprising a casing having inlet and outlet valves mounted therein, means for operating said valves including a pedal and a plate pivotally mounted on the casing, a pair of leaf springs having one end thereof rigidly connected to said pedal, one of said springs being in operative engagement with said plate, a diaphragm in said casing, a plunger operatively associated with said valves and diaphragm, a piston operatively associated with said plunger and diaphragm, means for connecting one of said springs with said piston, means for connecting the other of said springs with said plunger, and means for resiliently maintaining said springs in such engagement.

15. A control valve for fluid pressure mechanism comprising a casing, a pressure responsive member forming a pressure chamber in said casing, inlet and outlet chambers in said casing, inlet and exhaust valves in said casing for controlling the flow of pressure fluid into and out of said outlet chamber, a valve actuating plunger operatively associated with said member, a piston operatively associated with said member, means for moving said plunger and piston to operate said valves, said last named means including a pedal mounted on said casing, a plate mounted on said casing, a pair of leaf springs having one end thereof rigidly secured to said pedal, one of said springs being operatively connected with said plate, means connecting the opposite end of the last mentioned spring to said plunger, and means connecting the corresponding end of the other spring to said piston.

16. A control valve for fluid pressure mechanism comprising a casing, a pressure responsive member forming a pressure chamber in said casing, inlet and outlet chambers in said casing, inlet and exhaust valves in said casing for controlling the flow of pressure fluid into and out of said outlet chamber, a valve actuating plunger slidably mounted in said member, a piston operatively associated with said member and surrounding a portion of said plunger, means for moving said plunger and piston to operate said valves, said last named means including a pedal mounted on said casing, a plate mounted on said casing, a pair of valve graduating leaf springs having one end thereof rigidly secured to said pedal, one of said springs being operatively connected to said plate, means connecting the opposite end of the last mentioned spring with said plunger and means connecting the corresponding end of the other of said springs to said piston.

17. A control valve for fluid pressure mechanism comprising a casing, a pressure responsive member forming a pressure chamber in said casing, inlet and outlet chambers in said casing, inlet and exhaust valves in said casing controlling the flow of pressure fluid into and out of said outlet chamber, a plunger operatively connecting said valves and said member, a piston operatively associated with said plunger and said member, means for moving said plunger to close the exhaust valve, means for moving said piston, pressure responsive member, and plunger to operate said valves, said means including a pedal mounted on said casing, a plate movable relative to said pedal mounted on said casing, a pair of leaf springs having one end thereof secured to said pedal, one of said springs being operatively associated with said plate, means operatively connecting said spring with said plunger, and means operatively connecting the other of said springs with said piston.

18. In combination with a fluid motor, means including a remotely positioned self-lapping valvular mechanism for controlling the flow of fluid to and from said motor, comprising intake and exhaust valves, means for controlling the action of said valves comprising a diaphragm, a plunger slidably mounted in said diaphragm having a collar cooperable with said diaphragm for limiting movement of said plunger with respect to said diaphragm, a piston operatively connected with said diaphragm and plunger, means for actuating said plunger and piston comprising a pivotally mounted pedal, a pivotally mounted plate movable relative to said pedal, and means for operatively connecting said plate with said plunger and said pedal with said piston comprising a pair of leaf springs having one end thereof rigidly mounted on said pedal, one of said springs being operatively associated with said plate and having its opposite end operatively connected to said plunger, and the other of said springs having the corresponding end thereof operatively connected to said piston.

19. A control valve for a fluid pressure mechanism comprising a casing, inlet and outlet valves in said casing, an assembly for actuating said valves including a diaphragm, a plunger slidably mounted in said diaphragm having a collar cooperable with said diaphragm for limiting movement of said plunger relative to said diaphragm, a piston operatively connected with said plunger and diaphragm, control means for actuating said assembly comprising a pedal pivotally mounted on said casing, a plate movable relative to said pedal pivotally mounted on said casing, and means for connecting said control means with said assembly to close the exhaust valve upon movement of said plate and to open said inlet valve upon movement of said pedal comprising a pair of leaf springs having one end thereof rigidly secured to said pedal, one of said springs being operatively associated with said plate and having the opposite end thereof operatively connected with said plunger, the other of said springs being operatively connected with said piston.

THOMAS J. TUREK.